United States Patent
Yamamoto (10) Patent No.: US 11,244,129 B2
(45) Date of Patent: Feb. 8, 2022

(54) VEHICULAR SYSTEM AND TAG COMMUNICATION METHOD

(71) Applicant: Aichi Steel Corporation, Tokai (JP)

(72) Inventor: Michiharu Yamamoto, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 24 days.

(21) Appl. No.: 16/647,874

(22) PCT Filed: Sep. 10, 2018

(86) PCT No.: PCT/JP2018/033406
§ 371 (c)(1),
(2) Date: Mar. 17, 2020

(87) PCT Pub. No.: WO2019/065176
PCT Pub. Date: Apr. 4, 2019

(65) Prior Publication Data
US 2020/0285822 A1    Sep. 10, 2020

(30) Foreign Application Priority Data

Sep. 28, 2017  (JP) .............................. JP2017-188677
Mar. 16, 2018  (JP) .............................. JP2018-049194

(51) Int. Cl.
*G06K 7/10*      (2006.01)
*H04W 4/44*      (2018.01)

(52) U.S. Cl.
CPC ..... *G06K 7/10405* (2013.01); *G06K 7/10316* (2013.01); *H04W 4/44* (2018.02)

(58) Field of Classification Search
CPC ....... G06K 7/10405; G06K 7/08; H04W 4/44; G08G 1/096783; G08G 1/042; G08C 17/04

(Continued)

(56) References Cited

U.S. PATENT DOCUMENTS 5,420,569 A * 5/1995 Dames ................... G01V 15/00
340/572.6
5,815,825 A    9/1998 Tachibana et al.
(Continued)

FOREIGN PATENT DOCUMENTS

EP    1 209 648 A2    5/2002
JP    8-314540 A     11/1996
(Continued)

OTHER PUBLICATIONS

International Search Report and Written Opinion dated Nov. 13, 2018 for PCT/JP2018/033406 filed on Sep. 10, 2018, 11 pages including English Translation of the International Search Report.

(Continued)

*Primary Examiner* — Vernal U Brown
(74) *Attorney, Agent, or Firm* — Xsensus LLP (57) ABSTRACT

A vehicular system (1) detects a magnetic marker (10) laid in a road and wirelessly communicates with a wireless tag (15) attached to the magnetic marker (10). The system includes a measuring unit (2) which detects the magnetic marker (10) by sensing magnetism, a tag reader (34) which executes a communication process with the wireless tag (15), and a control unit (32) which sets a communication start point as a start point of the communication process by the tag reader (34). The control unit (32) sets, as a communication start point, a time after a lapse of specified time with reference to a time point of detection at which the measuring unit (2) detects the magnetic marker (10). Upon reading information from the wireless tag (15), the tag reader (34) terminates communication, thereby shortening a communication time.

22 Claims, 10 Drawing Sheets

(58) Field of Classification Search
USPC .......................................................... 340/10.1
See application file for complete search history.

(56) References Cited

U.S. PATENT DOCUMENTS

| | | | | | |
|---|---|---|---|---|---|
| 6,097,312 | A | * | 8/2000 | Tanji | ...................... G08G 1/042 340/905 |
| 2017/0126286 | A1 | | 5/2017 | Oishi | |

FOREIGN PATENT DOCUMENTS

| | | |
|---|---|---|
| JP | 10-21492 A | 1/1998 |
| JP | 2002-63683 A | 2/2002 |
| JP | 2010-216955 A | 9/2010 |
| JP | 2017-84269 A | 5/2017 |
| WO | 2008/035433 A1 | 3/2008 |

OTHER PUBLICATIONS

Extended European Search Report dated May 28, 2021 in European Application No. 18862099.1.

* cited by examiner

VEHICULAR SYSTEM AND TAG COMMUNICATION METHOD

CROSS-REFERENCE TO RELATED APPLICATIONS

The present application is based on PCT filing PCT/JP2018/033406, filed Sep. 10, 2018, which claims priority to JP 2017-188677, filed Sep. 28, 2017, and JP 2018-049194, filed Mar. 16, 2018, the entire contents of each are incorporated herein by reference.

TECHNICAL FIELD

The present invention relates to a vehicular system and a tag communication method for communication between a wireless tag on a road side and a vehicle side.

BACKGROUND ART

Conventionally, for example, a vehicular navigation system has been suggested in which wireless communication is performed with a wireless tag installed at a manhole or the like on a road surface to acquire highly-accurate position information (for example, refer to Patent Literature 1). This navigation system includes a database having stored therein position information indicating a laying position of each wireless tag. A navigation apparatus refers to this database to acquire position information to which a tag ID acquired from a wireless tag is linked.

By utilizing the wireless tag laid in the road in this manner, the vehicle's position can be acquired even in a traveling situation in which GPS (Global Positioning System) waves cannot be sufficiently received, for example, in a tunnel or between buildings and so forth. This enables achievement of highly-accurate navigation irrespective of the traveling environment.

CITATION LIST

Patent Literature

Patent Literature 1: Japanese Unexamined Patent Application Publication No. 2010-216955

SUMMARY OF INVENTION

Technical Problem

However, the above-described system using the wireless tag has the following problem. That is, it is required to enhance transmission waves and/or a frequency of performing communication so as to allow communication with the wireless tag with high reliability without missing it during vehicle's traveling, and thus, mutual interference and/or crosstalk of electric waves are likely to occur, making communication between the wireless tag and the vehicle side unstable.

The present invention was made in view of the above-described conventional problem, and is to provide a vehicular system and a tag communication method for highly reliable communication with a wireless tag.

Solution to Problem

One mode of the present invention resides in a vehicular system which wirelessly communicates with a wireless tag attached to a magnetic marker laid in a road, the system including, a marker detecting part which detects the magnetic marker by sensing magnetism, a wireless communication part which acquires tag information by executing a communication process with the wireless tag, and a communication start point setting part which sets a communication start point at which the wireless communication part is caused to start the communication process, wherein the communication start point setting part sets the communication start point with reference to a time point of detection at which the marker detecting part detects the magnetic marker, and the wireless communication part is configured to start the communication process at the communication start point and terminate the communication process upon acquisition of the tag information from the wireless tag.

One mode of the present invention resides in a tag communication method regarding a vehicle including a wireless communication part which performs wireless communication with a wireless tag attached to a magnetic marker laid in a road and acquires tag information from the wireless tag, the method for controlling the wireless communication part to cause a communication process to be executed with the wireless tag, the method including, setting a communication start point with reference to a time point of detection of the magnetic marker at which the wireless communication part is caused to start the communication process, and terminating the communication process upon acquisition of the tag information from the wireless tag after the communication process has started by reaching the communication start point.

Advantageous Effects of Invention

In the vehicular system or the tag communication method of the present invention, the communication start point is set with reference to the time point of detection of the magnetic marker. And, the communication process started at this communication start point immediately terminates upon acquisition of the tag information. In this manner, if the communication process immediately terminates upon acquisition of the tag information from the wireless tag after the communication process has started at the communication start point, the period of transmission or the frequency of transmission of electric waves from the wireless tag and/or the wireless communication part can be shortened or reduced. This suppresses a possibility of interference or crosstalk of electric waves and improves communication reliability between the wireless tag and the vehicle side.

DESCRIPTION OF EMBODIMENTS

Modes of the present invention are specifically described by using the following embodiments.

First Embodiment

The present embodiment is an example regarding a tag communication method and a vehicular system 1 for reading tag information from an RF-ID tag (Radio Frequency IDentification Tag or wireless tag) 15 attached to a magnetic marker 10. Details of this are described by using FIG. 1 to FIG. 9.

Figure 1:
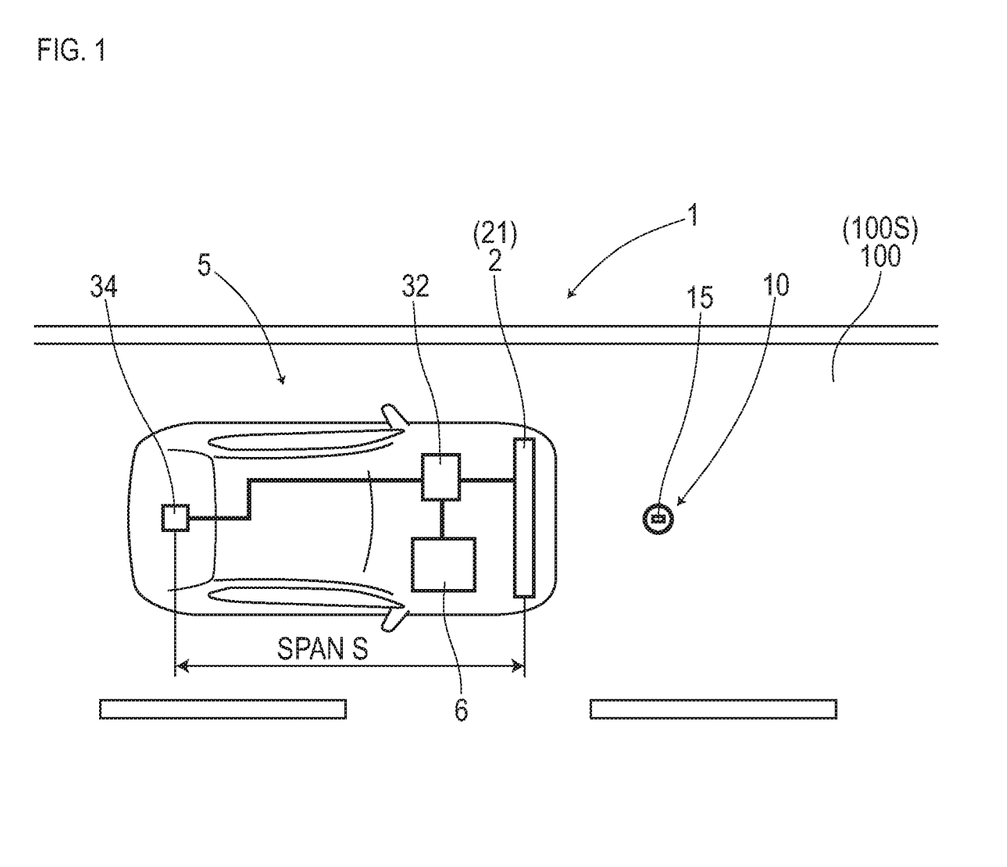
FIG. 1 is a diagram of a configuration of a vehicular system.
Figure 2:
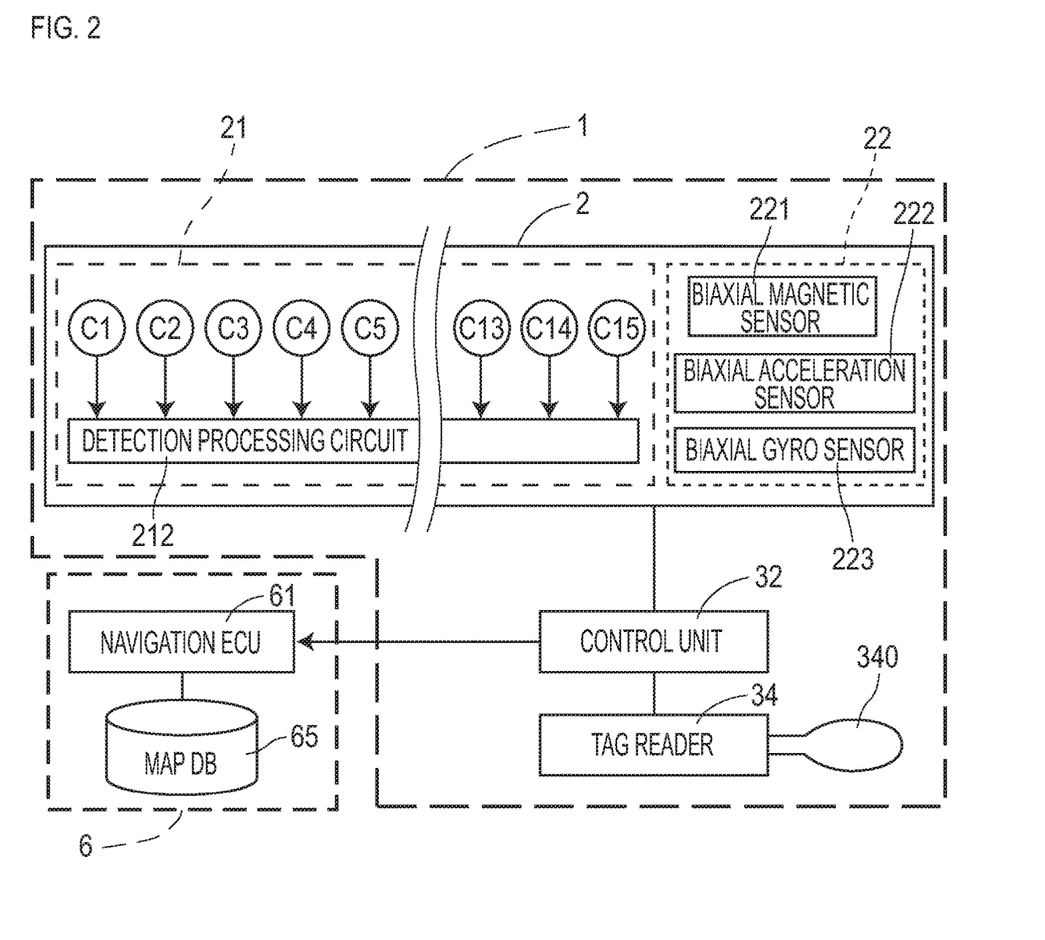
FIG. 2 is a block diagram depicting an electrical configuration of the vehicular system.

The vehicular system 1 is configured to include, as in FIG. 1 and FIG. 2, a measuring unit 2 serving as one example of a marker detecting part which detects the magnetic marker 10, a tag reader 34 serving as one example of a wireless communication part which reads tag information from the RF-ID tag 15 attached to the magnetic marker 10, and a control unit 32 which controls the measuring unit 2 and the tag reader 34. The vehicular system 1 acquires position data of the magnetic marker 10 via an ID code (identification code) of the RF-ID tag 15, and identifies an own vehicle position as a position where a vehicle is located.

In the present embodiment, this vehicular system 1 is combined with a navigation system 6. The navigation system 6 is a system configured to include a navigation ECU 61 which achieves navigation functions and a map database (map DB) 65 having detailed three-dimensional map data (3D map data) stored therein. The navigation ECU 61 uses the own vehicle position identified by the vehicular system 1 to display a peripheral map, perform a route guidance and so forth by screen display, audio output, or the like.

In the following, after the magnetic marker 10 to be laid in a road is generally described, details of the measuring unit 2, the tag reader 34, and the control unit 32 are described.

The magnetic marker 10 is, as in FIG. 1, a road marker to be laid in a road surface 100S of a road where a vehicle 5 travels. The magnetic markers 10 are arranged with, for example, 10 m spacing, along a center of a lane (reference numeral 100 in FIG. 1) divided by left and right lane marks.

The magnetic marker 10 (FIG. 3) is formed in a columnar shape with a diameter of 20 mm and a height of 28 mm, and can be accommodated in a hole provided in the road surface 100S. A magnet forming the magnetic marker 10 is an isotropic ferrite plastic magnet with magnetic powder of iron oxide as a magnetic material dispersed in a polymer material as a base material, and has a characteristic of a maximum energy product (BHmax)=6.4 kJ/m$^3$. This magnetic marker 10 is laid in a state of being accommodated in a hole bored in the road surface 100S.

Specifications of the magnetic marker 10 of the present embodiment are partially depicted in Table 1.

TABLE 1

| Type of magnet | Ferrite plastic magnet |
|---|---|
| Diameter | φ 20 mm |
| Height | 28 mm |
| Magnetic flux density Gs of the surface | 45 mT |

This magnetic marker 10 can act magnetism with a magnetic flux density of 8 μT (8×10$^{-6}$T, T: tesla) at a height of 250 mm, which is an upper limit in a range of 100 to 250 mm assumed as a mounting height of the measuring unit 2.

Figure 3:
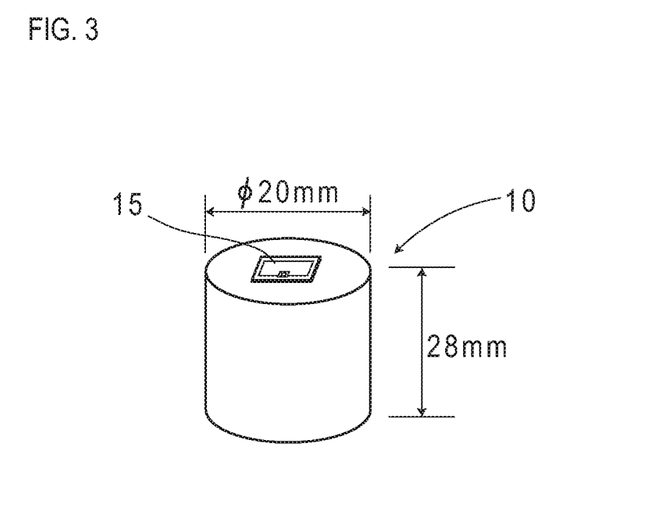
FIG. 3 is a diagram depicting a magnetic marker with an RF-ID tag attached thereto.
Figure 4:
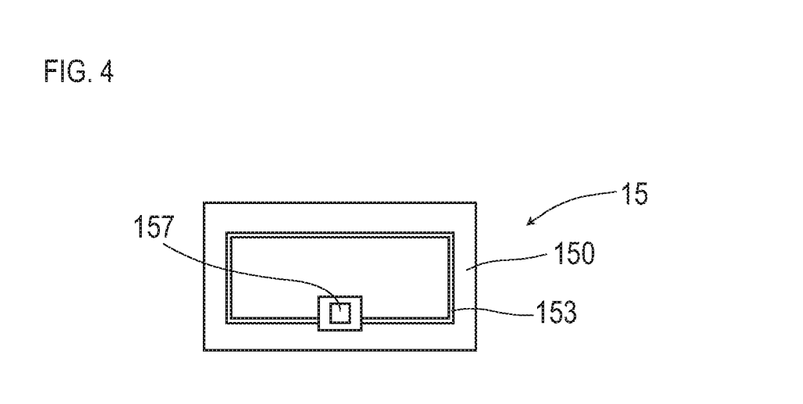
FIG. 4 is a front view of the RF-ID tag.

On one end face of the magnetic marker 10 in a substantially columnar shape, as in FIG. 3 and FIG. 4, an RF-ID tag 15 which wirelessly outputs information is laminated and affixed. This RF-ID tag 15 is a tag of a passive type, operates with wireless external power supply, and transmits tag information including the ID code. Note that the magnetic marker 10 is laid in the road so that the RF-ID tag 15 is positioned upward.

The RF-ID tag 15 (FIG. 4) is an electronic component having an IC chip 157 implemented on a surface of a tag sheet 150 cut out from, for example, PET (PolyEthylene Terephthalate) film. On the surface of the tag sheet 150, a printed pattern of an antenna 153 is provided. The RF-ID tag 15 operates by electric power taken out from received waves by the antenna 153, and returns the tag information superposed on reflected waves by the antenna 153.

Next, the measuring unit 2, the tag reader 34, and the control unit 32 included in the vehicle 5 are described.

The measuring unit 2 is, as in FIG. 2, a unit with a sensor array 21 including magnetic sensors Cn and an IMU (Inertial Measurement Unit) 22 which allows positioning by inertial navigation calculation integrated together.

The measuring unit 2 is a stick-shaped unit elongated in a vehicle-width direction, and is mounted, for example, inside a front bumper of the vehicle in a position as facing the road surface 100S. In the case of the vehicle 5 of the present embodiment, the mounting height of the measuring unit 2 with reference to the road surface 100S is set at 200 mm.

The sensor array 21 of the measuring unit 2 includes, as in FIG. 2, fifteen magnetic sensors Cn (n is an integer from 1 to 15) arrayed in a straight line along the vehicle-width direction and a detection processing circuit 212 having incorporated therein a CPU and so forth not depicted. Note that in this sensor array 21, the fifteen magnetic sensors Cn are arranged equidistantly with spacing of 10 cm. The sensor array 21 is mounted so that a central magnetic sensor C8 is positioned at the center of the vehicle 5 in the vehicle-width direction.

The magnetic sensor Cn is a sensor which detects magnetism by using a known MI effect (Magneto Impedance Effect) in which an impedance of a magneto-sensitive body such as amorphous wire sensitively changes in accordance with an external magnetic field. The magnetic sensor Cn can measure the magnitude of magnetic components acting on a longitudinal direction of the amorphous wire. In the present embodiment, the magnetic sensors Cn are incorporated in the sensor array 21 so as to be able to detect magnetic components in a forwarding direction of the vehicle 5.

The magnetic sensor Cn is a highly-sensitive sensor with a measurement range of magnetic flux density of ±0.6 mT and a magnetic flux density resolution in the measurement range of 0.02 μT. In the present embodiment, the frequency of magnetic measurement by each magnetic sensor Cn of the measuring unit 2 is set at 3 kHz so as to support high-speed traveling of the vehicle.

Specifications of the magnetic sensor Cn are partially depicted in Table 2.

TABLE 2

| Measurement range | ±0.6 mT |
|---|---|
| Magnetic flux density resolution | 0.02 µT |
| Sampling frequency | 3 kHz |

As described above, the magnetic marker 10 can act magnetism with a magnetic flux density equal to or larger than 8 µT in the range of 100 to 250 mm assumed as a mounting height of the magnetic sensor Cn. If the magnetic marker 10 acts with magnetism having a magnetic flux density equal to or larger than 8 µT, it can be detected with high reliability by using the magnetic sensors Cn with a magnetic flux density resolution of 0.02 µT.

The detection processing circuit 212 (FIG. 2) of the sensor array 21 is an arithmetic circuit which executes marker detection process for detecting the magnetic marker 10, and so forth. Although not depicted in the drawing, this detection processing circuit 212 is configured to include a CPU (central processing unit), which executes various arithmetic processes, and memory elements such as a ROM (read only memory) and a RAM (random access memory).

The detection processing circuit 212 executes a marker detection process by acquiring sensor signals outputted from each magnetic sensor Cn at a frequency of 3 kHz. In the marker detection process, in addition to detection of the magnetic marker 10, measurement of a lateral shift amount of the vehicle 5 with reference to the detected magnetic marker 10 is performed. Note that the detection result of this marker detection process is inputted to the control unit 32 as needed.

The IMU 22 incorporated in the measuring unit 2 is an inertial navigation unit which estimates a relative position of the vehicle 5 by inertial navigation calculation. The IMU 22 includes a biaxial magnetic sensor 221 as an electronic compass which measures an azimuth, a biaxial acceleration sensor 222 which measures acceleration, and a biaxial gyro sensor 223 which measures an angular velocity.

Next, the tag reader 34 is a communication unit including a wireless antenna 340. In the vehicular system 1 of the present embodiment, the tag reader 34 is arranged on a rear side of the vehicle 5 while the sensor array 21 is arranged on a front side of the vehicle 5, and a space between the sensor array 21 and the tag reader 34 is a span S (refer to FIG. 1). In the present embodiment, the span S is, for example, 3.5 m.

The tag reader 34 executes a wireless communication process with the RF-ID tag 15 laminated and affixed on the surface of the magnetic marker 10. In this communication process using, for example, a 900-MHz band, power required for operation of the RF-ID tag 15 is wirelessly fed (power-feeding process), and reading of the tag information from the RF-ID tag 15 is performed. Then, upon completion of reading of the tag information and acquisition of the tag information, the tag reader 34 immediately cuts off communication and terminates the communication process. The tag information includes an ID code (of the RF-ID tag 15) which allows the corresponding magnetic marker 10 to be identified.

The control unit 32 is a unit which controls the measuring unit 2 and the tag reader 34, and identifies the own vehicle position (position of the vehicle 5) on a real-time basis. The control unit 32 inputs the identified own vehicle position to the navigation ECU 61 configuring the navigation system 6. This control unit 32 has a function as a communication start point setting part which sets a communication start point at which the tag reader 34 is caused to perform wireless communication with reference to a time point of detection of the magnetic marker 10.

The control unit 32 includes an electronic board (omitted in the drawing) having a CPU which executes various arithmetic processes as well as memory elements such as a ROM and a RAM implemented thereon. A storage area formed by the memory elements and so forth is provided with a database having stored therein position data indicating laying positions (absolute position) of each magnetic marker 10. In this database, position data of each magnetic marker 10 is stored as being linked with the ID code of the RF-ID tag 15. Furthermore this storage area is provided with a storage part storing the span S, which is a space between the sensor array 21 and the tag reader 34. In the present embodiment, this storage part stores a value of 3.5 m as the span S. This value of the span S is read from the storage part by the control unit 32 having a function as an acquiring part, and is used for an arithmetic process for setting a communication start point.

Note that methods for the control unit 32 to identify the own vehicle position differ when the vehicle 5 reaches the magnetic marker 10 and when the vehicle 5 is positioned between adjacent magnetic markers 10. At a time of detection of the magnetic marker 10, the control unit 32 uses the ID code included in the tag information read from the annexed RF-ID tag 15 to refer to the database, and acquires position data of the corresponding magnetic marker 10 to identify the own vehicle position. On the other hand, when the vehicle 5 is positioned between adjacent magnetic markers 10, the own vehicle position identified at the time of detection of the magnetic marker 10 immediately before is taken as a reference position, and a relative position based on the reference position is estimated by inertial navigation calculation.

Specifically, the control unit 32 calculates a displacement amount by second-order integration of measured accelerations by the IMU 22 incorporated in the measuring unit 2. Then, displacement amounts are accumulated along changes in the forwarding direction of the vehicle 5 detected by the biaxial gyro sensor 223 and/or the measured azimuth to estimate a relative position. The control unit 32 identifies a position acquired by adding this relative position to the above-described reference position as an own vehicle position.

Upon capturing the own vehicle position from the control unit 32, the navigation ECU 61 refers to the map DB 65 to read peripheral map data and causes it to be displayed on a display apparatus not depicted. Furthermore, if a route is set in advance, the navigation ECU 61 performs display or audio output of a route guidance in accordance with the location of the own vehicle position in the route, for example, "turn right at the intersection 300 m ahead" or the like.

Figure 5:
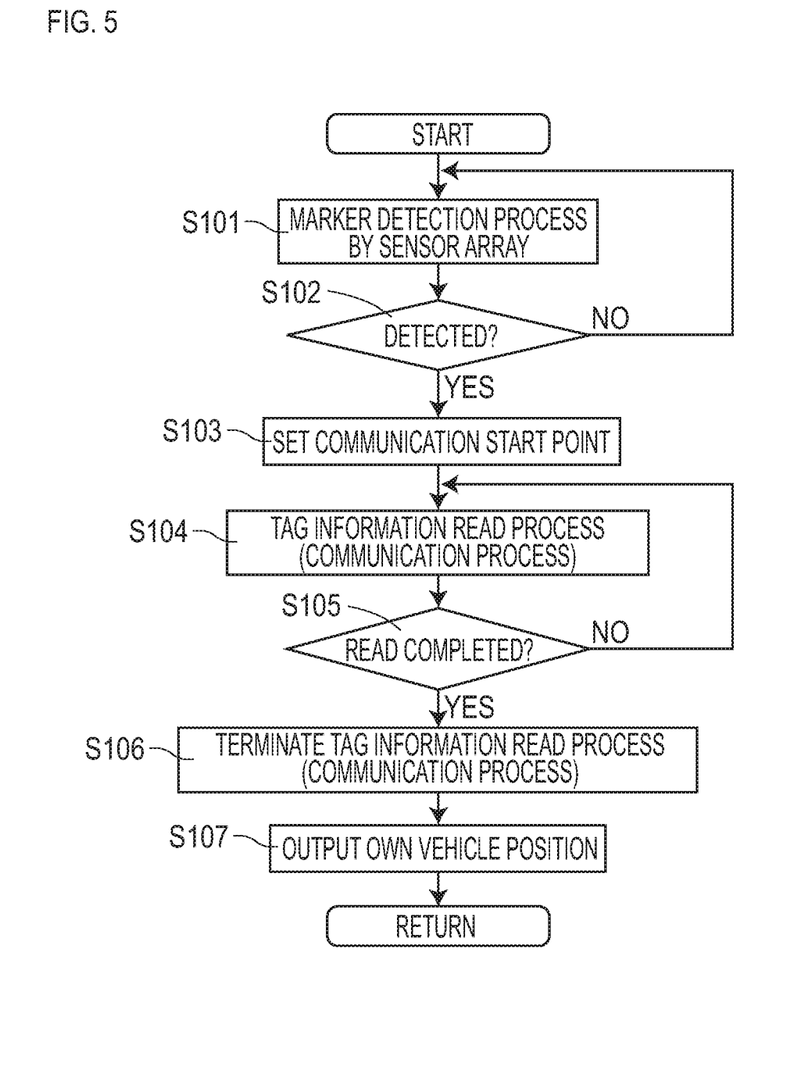
FIG. 5 is a flow chart depicting a whole operation of the vehicular system.

Next, details of (1) system operation of the vehicular system 1, (2) a marker detection process by the sensor array 21, and (3) a tag information read process as communication process by the tag reader 34 are sequentially described. Here, (2) the marker detection process and (3) the tag information read process are processes to be executed during (1) system operation (FIG. 5). (2) The marker detection process is a process for magnetically detecting the magnetic marker 10. (3) The tag information read process is a process of reading tag information from the RF-ID tag 15 via wireless communication.

(1) System Operation of Vehicular System 1

In the vehicular system 1, as in FIG. 5, (2) the marker detection process, which will be described further below, by the sensor array 21 is repeatedly executed during traveling of the vehicle 5 (S101→S102: NO). When the magnetic marker 10 is detected by the sensor array 21 (S102: YES), the control unit 32 sets a time point after a of a specified time with reference to the time point of detection of the magnetic marker 10 as a communication start point at which communication with the RF-ID tag 15 is started (S103).

Figure 6:
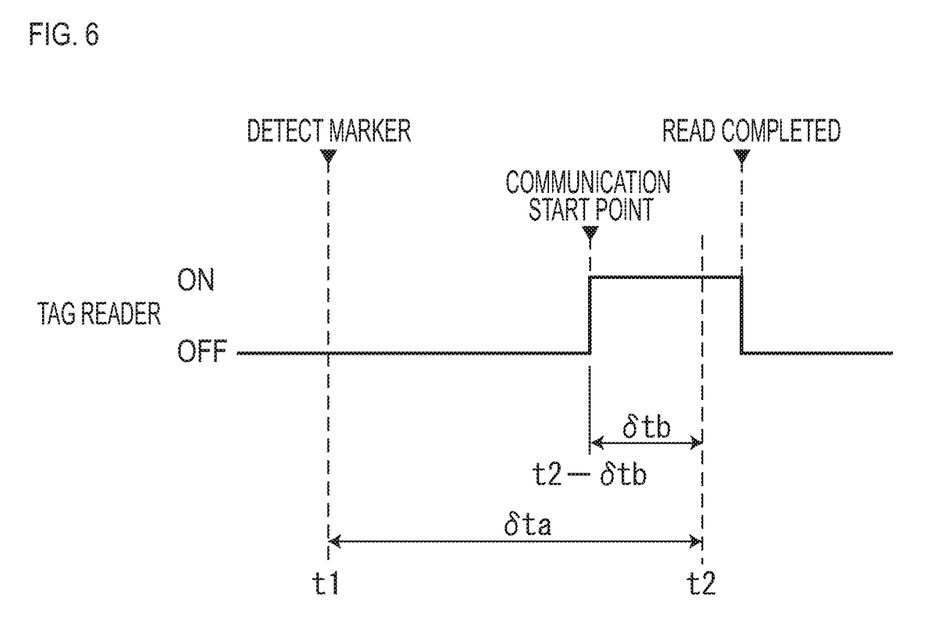
FIG. 6 is a descriptive diagram of a communication start point set to a tag reader.
Figure 7:
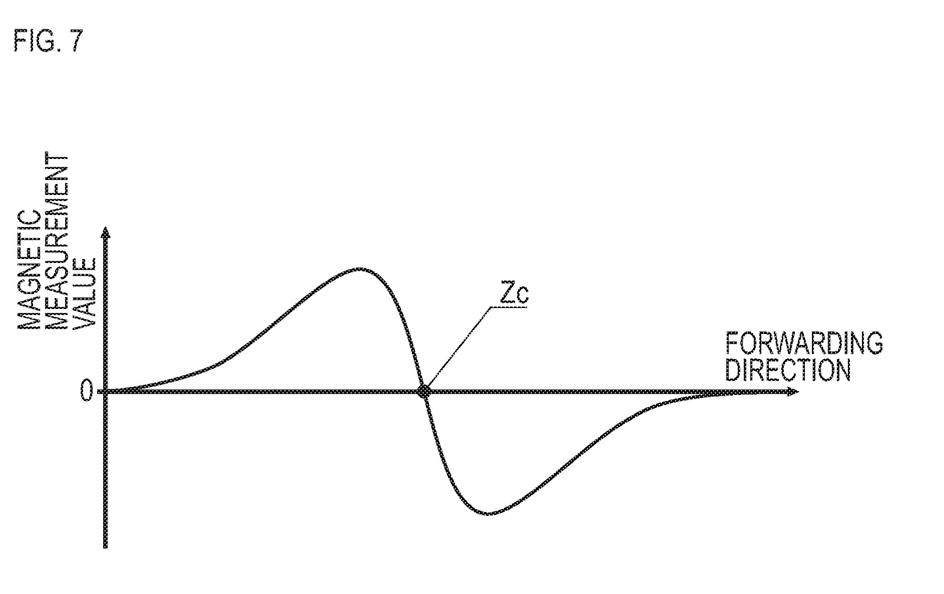
FIG. 7 is a graph depicting temporal changes of a magnetic measurement value by a sensor array.
Figure 8:
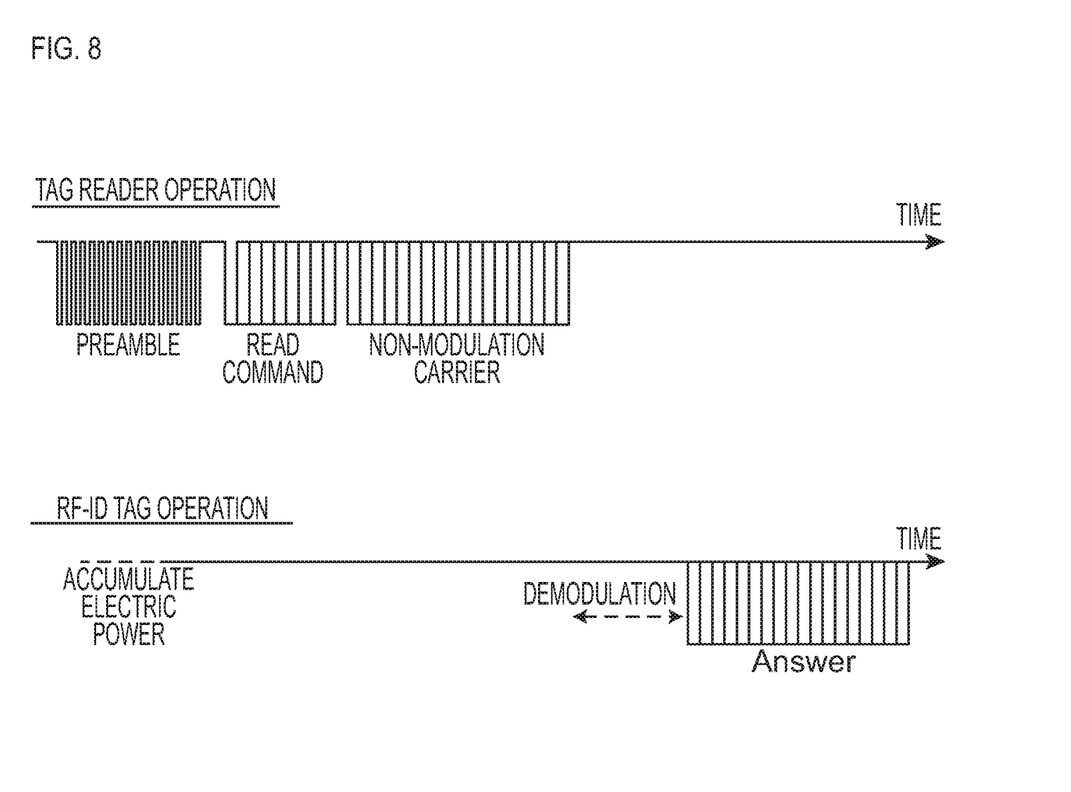
FIG. 8 is a descriptive diagram of a command sequence between the RF-ID tag and the tag reader.

Specifically, as in FIG. 6, the control unit 32 divides the span S (m) between the sensor array 21 and the tag reader 34 by the vehicle speed (speed of the vehicle) V (m/sec) to obtain a required time δta required for passage over a distance corresponding to the span S. Then, this required time δta is added to a time t1 which is a time point of detection of the magnetic marker 10 by the sensor array 21. With this addition of the required time δta to the time t1, it is possible to predict a time t2 at which the tag reader 34 arranged on the rear side of the vehicle passes straight above the magnetic marker 10. Note that the vehicle speed V (m/sec) can be obtained by integration of measured accelerations by the IMU 22 incorporated in the measuring unit 2.

The control unit 32 sets, as the above-described communication start point, a time (t2−δtb) in which a sectional time δtb obtained by dividing 1 (m) as a reference distance by the vehicle speed V (m/sec) is subtracted from the time t2, that is, a time at which the tag reader 34 reaches 1 m before the magnetic marker 10. Here, the specified time, which is an elapsed time from the time point of detection of the magnetic marker 10 to this communication start point, is a time obtained by subtracting δtb from δta, that is, a time required for the vehicle with the vehicle speed V (m/sec) to pass through a distance (S−1) in which the reference distance (1 m) is subtracted from the above-described span S (3.5 m). This specified time depends on the vehicle speed V (m/sec), and is shorter as the vehicle speed is higher and longer as the vehicle speed is lower.

Note that the reference distance can be changed as appropriate taking into account the size of a communication area or the like, which is a distance range where the tag reader 34 can communicate with the RF-ID tag 15.

Note that a required time required for passage over a distance in which 1 m as the reference distance is subtracted from the span S may be obtained. A time point obtained by adding this required time to the time t1 which is a time point of detection of the magnetic marker 10 can beset as a communication start point. This communication start point is the same time point as the communication start point in FIG. 6. This mode of setting of the communication start point is also included in modes of setting the communication start point based on a time point elapsed from the above-described time point of detection by the time required for the vehicle to travel the distance of the span S.

When the time reaches the communication start point set as described above, a communication process by the tag reader 34 (tag information read process, which will be described further below) starts, and reading of the tag information from the RF-ID tag 15 is performed (S104). Then, after completion of reading of the tag information (S105: YES), the tag reader 34 immediately terminates the tag information read process (S106). In this manner, if the tag information read process is immediately terminated in response to reading of the tag information, the period of electric-wave transmission can be shortened, and thus interference and/or crosstalk of electric waves can be reliably prevented.

After reading of the tag information by the tag reader 34, the control unit 32 acquires position data of the magnetic marker 10 via the ID code included in the read tag information, and identifies and outputs the own vehicle position based on this position data (S107). Specifically, the control unit 32 identifies the own vehicle position by subtracting a lateral shift amount measured at the time of detection of the magnetic marker 10 from the position indicated by the position data (laying position of the magnetic marker 10).

(2) Marker Detection Process

The marker detection process is a process to be executed by the sensor array 21 of the measuring unit 2 under control by the control unit 32. The sensor array 21 executes, as described above, the marker detection process with a frequency of 3 kHz by using the magnetic sensors Cn.

As described above, the magnetic sensors Cn are configured to measure magnetic components in the forwarding direction of the vehicle 5. For example, when this magnetic sensor Cn moves in the forwarding direction and passes straight above the magnetic marker 10, a magnetic measurement value in the forwarding direction is reversed between positive and negative before and after each magnetic marker 10 as in FIG. 7, and changes at a position straight above the magnetic marker 10 so as to cross zero. Therefore, during traveling of the vehicle 5, regarding the magnetism in the forwarding direction detected by any of the magnetic sensors Cn, when a zero cross Zc where its sign is reversed occurs, it can be determined that the measuring unit 2 is positioned straight above the magnetic marker 10. The detection processing circuit 212 determines that the magnetic marker 10 is detected when the measuring unit 2 is positioned straight above the magnetic marker 10 and the zero cross of the magnetic measurement value in the forwarding direction occurs.

Note that the detection processing circuit 212 identifies the position of an extremal value in the vehicle-width direction in a distribution of magnetic measurement values of each magnetic sensor Cn when the measuring unit 2 is positioned straight above the magnetic marker 10 (magnetic distribution in the vehicle-width direction). The detection processing circuit 212 detects a deviation between the position of the extremal value in the vehicle-width direction and the position of the magnetic sensor C8 corresponding to the center in the vehicle-width direction as a lateral shift amount of the vehicle 5 with reference to the magnetic marker 10.

(3) Tag Information Read Process

The tag information read process is a communication process to be executed by the tag reader 34 to read the tag information from the RF-ID tag 15 attached to the magnetic marker 10. At the above-described communication start point set by the control unit 32 at the time of detection of the magnetic marker 10 (refer to FIG. 6), the tag reader 34 starts a tag information read process (communication process) under control by the control unit 32. Then, the tag reader 34 terminates the tag information read process upon completion of reading of the tag information.

In response to the start of the tag information read process, the tag reader 34 starts transmission of electric waves. The tag reader 34 transmits electric waves, as in FIG. 8, in order of preamble electric waves, READ-command-modulated electric waves, and non-modulated carrier waves. The RF-ID tag 15 rectifies the preamble electric waves to accumulate power required for an initial operation of IC.

Then, it demodulates the electric waves which include a READ command to acquire the READ command and superposes data on reflected waves of the non-modulated carrier waves, thereby returning (Answer) the tag information.

Upon reading the tag information from the RF-ID tag 15, the tag reader 34 inputs that tag information to the control unit 32, and cuts off communication with the RF-ID tag 15 to terminate the tag information read process. As described above, the tag information includes the ID code of the RF-ID tag 15. The control unit 32 acquiring this tag information refers to the above-described database having stored therein the position data of each magnetic marker 10 linked with the ID code of the RF-ID tag 15. Then, it acquires the position data of the magnetic marker 10 corresponding to the ID code included in the tag information, and identifies the own vehicle position by using this position data as described above.

As described, in the vehicular system 1, a communication start point is set with reference to the time point of detection of the magnetic marker 10 and, upon completion of reading the tag information, the tag information read process by the tag reader 34 immediately terminates. Therefore, in this vehicular system 1, by limiting transmission of electric waves from the tag reader 34 to a short time, a degree of congestion of electric waves can be mitigated, and mutual interference between the tag readers 34 can be reduced. With this, reliability of communication between the tag reader 34 and the RF-ID tag 15 can be improved, and missing of the tag information can be reduced.

Furthermore, in the case of this vehicular system 1, the presence of the RF-ID tag 15 is confirmed in response to the detection of the magnetic marker 10. As for the RF-ID tag 15 of which the presence is confirmed in advance, the necessity of searching a wide range by the tag reader 34 is small. Thus, in the vehicular system 1, it is possible to reduce communication output on a tag reader 34 side. Reduction of communication output on the tag reader 34 side is effective in reducing mutual interference with the tag readers 34 on other vehicles.

In the vehicular system 1 of the present embodiment, the tag reader 34 which reads the tag information is arranged on the rear side of the vehicle 5 with respect to the measuring unit 2 (sensor array 21) which detects the magnetic marker 10. Thus, with reference to the time point of detection of the magnetic marker 10, the communication start point may be set as being delayed in time from this time point of detection. Since there is a time margin from the time point of detection to the communication start point, the specifications of the processing speed required for the control unit 32 which sets the communication start point can be mitigated. If the required processing speed is made low, the control unit 32 can be configured with a relatively simple circuit, and hardware cost can be reduced.

Figure 9:
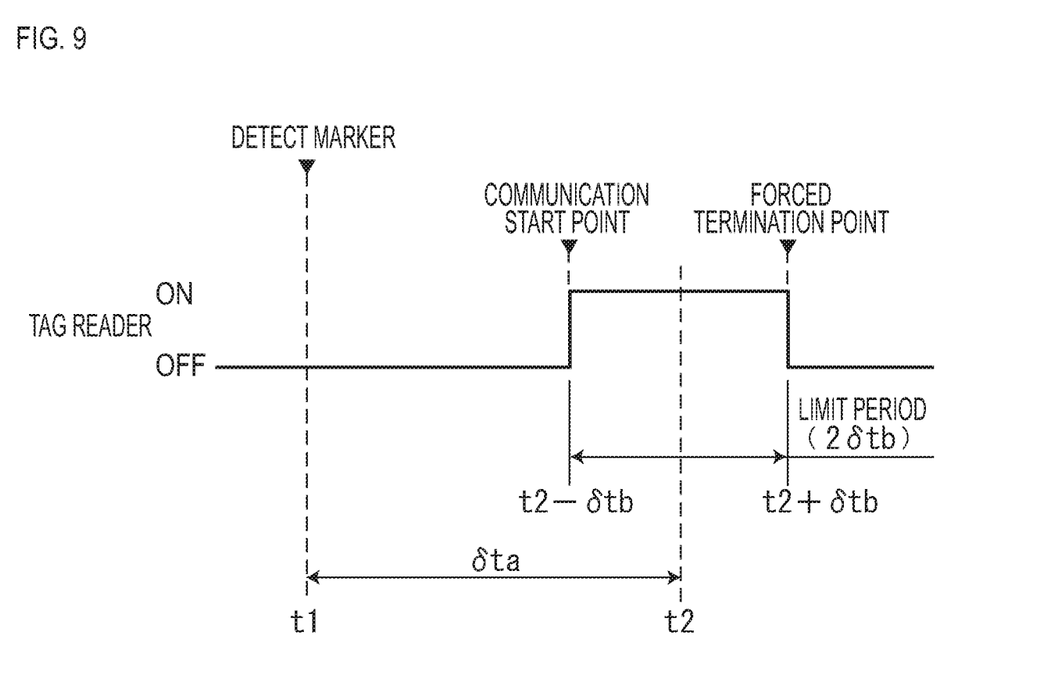
FIG. 9 is a descriptive diagram of a limit period set on the tag reader.

As depicted in FIG. 9, a limit period with the communication start point as a start time and a forced termination point as a termination time may be set. Here, as with the case of FIG. 6, a time (t2−δtb) is set as a communication start point, the time obtained by subtracting from the time t2 the sectional time δtb obtained by dividing 1 (m) as the reference distance by the vehicle speed V (m/sec). On the other hand, a time (t2+δtb) obtained by adding this sectional time δtb to the time t2 is set as a forced termination point for forcibly terminating the communication process (forced termination point setting part). In this limit period with the communication start point as a start time, if reading the tag information is completed, the communication process is preferably terminated immediately in the middle of the limit period. On the other hand, if the time reaches the forced termination point, the communication process is preferably terminated forcibly irrespective of whether the tag information has been read or not. With this configuration, for example, the tag reader 34 can cut off the communication in the case of passing over the RF-ID tag 15 without reading the tag information due to some trouble, and a situation in which useless transmission of electric waves continues can be avoided before it happens. With reduction of unnecessary transmission of electric waves by the tag reader 34, congestion of electric waves can be mitigated. Note that the time length of the above-described limit period, that is, a period from the communication start point to the forced termination point depends on the vehicle speed, and is shorter as the vehicle speed is higher and longer as the vehicle speed is lower.

Note that other than the configuration in which the measuring unit 2 and the tag reader 34 are arranged so as to be spaced in the longitudinal direction of the vehicle, a configuration can be thought in which both are arranged at the same position in the longitudinal direction. In the case of this configuration, the configuration may preferably be such that the communication process starts without delay when the magnetic marker 10 is detected by the measuring unit 2. Note that as with the above, the communication process terminates upon completion of reading the RF-ID tag 15.

The present embodiment exemplarily describes the tag information including the ID code of the RF-ID tag 15, and also exemplarily describes the configuration of referring to the database by using this ID code and acquiring the position data of the corresponding magnetic marker. Generally speaking, by using the ID code, the data size can be configured to be small compared with the position data. Thus, by adopting this configuration, the data size of the tag information can be reduced, and the time required for communication between the RF-ID tag 15 and the vehicle can be shortened. As a matter of course, if the communication time has a margin, the position data of the magnetic marker may be included in the tag information. Furthermore, the tag information may be provided additionally with or replaced by various information, for example, lane information such as a driving lane and an overtaking lane, road information such as a branch and a merge, and traffic information such as speed limit and one-way.

Second Embodiment

The present embodiment is an example obtained by changing the configuration based on the vehicular system of the first embodiment so that the spacing between the magnetic markers 10 in the forwarding direction of the vehicle is used to set a communication start point with the RF-ID tag 15. These details are described with reference to FIG. 5, FIG. 6, and FIG. 10. Note that FIG. 5 and FIG. 6 are those referred to in the first embodiment.

Figure 10:
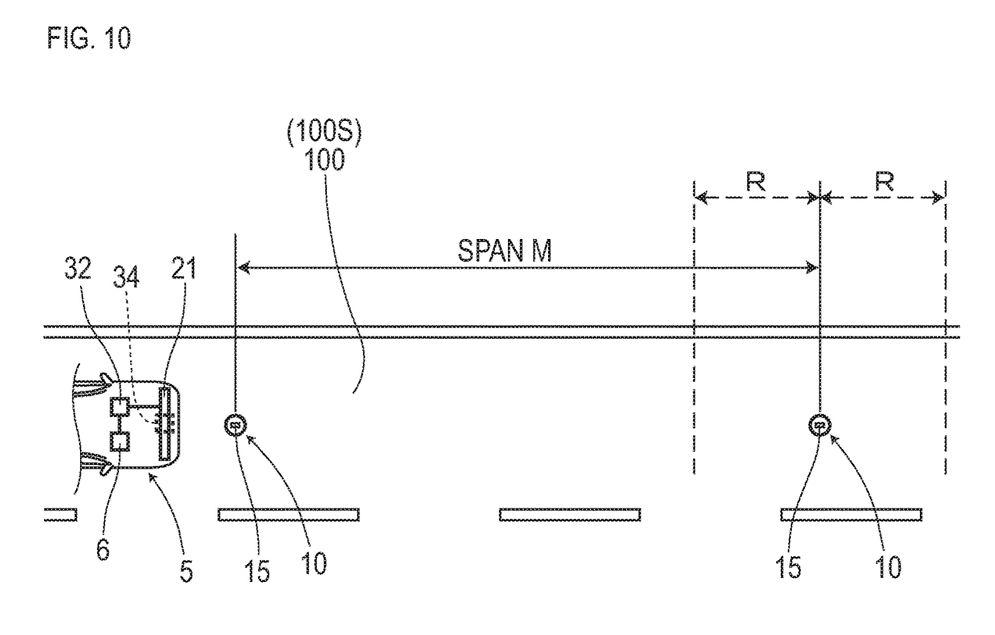
FIG. 10 is a descriptive diagram of a span M, which is an arrangement space between magnetic markers.

In the measuring unit 2 configuring the vehicular system 1 of the present embodiment, as in FIG. 10, the tag reader 34 is integrally incorporated, and the tag reader 34 is arranged at the same position as that of the sensor array 21 in the longitudinal direction (forwarding direction) of the vehicle 5. The magnetic markers 10 each with the RF-ID tag 15 attached thereto are arranged with 10 m spacing along the center of the lane 100. That is, a span M between adjacent magnetic markers 10 in the forwarding direction of the vehicle is 10 m. This span M is stored by the control unit 32 as a storage part, and is read by the control unit 32 as an acquiring part.

The whole operation of the vehicular system 1 of the present embodiment can be described by using the flow diagram of FIG. 5 referred to in the first embodiment. Furthermore, details of the arithmetic process at step S103 for setting a communication start point can also be described by using FIG. 6 referred to in the first embodiment.

However, the first embodiment and the present embodiment have different points described next. That is, while the magnetic marker determined as detected at S102 in FIG. 5 and the magnetic marker with the RF-ID tag 15 attached thereto as a target for the tag information read process at S104 are the same in the first embodiment, the magnetic marker at S102 and the magnetic marker at S104 are different in the case of the present embodiment. The magnetic marker at S104 is arranged ahead in the forwarding direction of the vehicle with respect to the magnetic marker at S102. The magnetic marker at S104 is newly detected after detection of the magnetic marker at S102.

Due to these differences, details of the arithmetic process at S103 in FIG. 5 are different from those of the first embodiment. In the case of the present embodiment, the required time δta in FIG. 6 is a time obtained by dividing the span M (m) as the spacing between the magnetic markers 10 by the vehicle speed V (m/sec). This δta is a required time required for passage over a distance corresponding to the span M. On the other hand, as with the first embodiment, the sectional time δtb is a time obtained by dividing 1 (m) as a reference distance by the vehicle speed V (m/sec). This reference distance may be 1 (m) as with the first embodiment, or can be changed as appropriate. Note that as with the first embodiment, the vehicle speed V (m/sec) can be obtained by integration of measured accelerations by the IMU incorporated in the measuring unit.

In the present embodiment, by adding the above-described required time δta to the time t1 which is the time point of detection of the magnetic marker 10 at S102 in FIG. 5, the time t2 as a time point at which the traveling vehicle reaches the next magnetic marker is predicted. And, the time point (t2−δtb) obtained by subtracting from this time t2 the above-described sectional time δtb is set as a communication start point. This time point (t2−δtb) is a time point at which the vehicle is predicted to reach a position before the next magnetic marker by the reference distance.

Note that the time point at which the vehicle is predicted to reach the position before the next magnetic marker by the reference distance can be obtained directly without calculation of the required time δta or the time t2. For example, it is possible to directly obtain the time point (t2−δtb) with an addition of a required time obtained by dividing a distance, in which the reference distance is subtracted from the span M, by the vehicle speed V to the time t1 which is a time point of detection of the magnetic marker at S102 in FIG. 5. This mode of setting the communication start point is also included in the modes of setting the communication start point based on the time point at which the vehicle reaches the next magnetic marker.

In the present embodiment, the configuration is exemplarily described in which the magnetic markers 10 each with the RF-ID tag 15 attached thereto are successively arranged with the spacing of span M along the lane (road) and the control unit 32 stores the span M in advance and the control unit 32 reads the span M. In place of this configuration, an acquiring part may be configured so as to acquire the span M by using data or the like stored in a database storing position data indicating the laying positions of the magnetic marker 10.

For example, in addition to the laying positions of the magnetic markers 10, data about the span M between adjacent magnetic markers 10 ahead in the longitudinal direction of the road, that is, ahead in the forwarding direction of the vehicle may be stored in the database. In this case, the control unit 32 as an acquiring part refers to the database by using the ID code read from the RF-ID tag 15 and can acquire data of the span M between adjacent magnetic markers 10 together with the data of the laying position of the corresponding magnetic marker 10.

Furthermore, for example, information indicating an adjacency relation among the magnetic markers arranged along the lane (road) may be included in the database. The adjacency relation is a relation about, for example, adjacency along the lane and so forth. In this case, when one magnetic marker is detected, by using the information indicating the adjacency relation, the next adjacent marker ahead in the forwarding direction of the vehicle can be identified. By referring to the database and reading the laying position of the detected magnetic marker and the laying position of the next magnetic marker, the span M as a separation distance between the laying positions at two locations can be calculated.

Note that as the span M becomes longer, prediction accuracy of a time point at which the vehicle reaches the next magnetic marker may be decreased due to changes in vehicle speed and so forth after detection of the first magnetic marker. That is, if the span M is long, a time error as a difference between the time point predicted by the control unit at which the vehicle will reach the next magnetic marker and the time point at which the vehicle actually reaches may expand. Therefore, a moving distance of the vehicle may be calculated by integrating the vehicle speed V (m/sec) every moment. The communication process may be started immediately at a time point set as a communication start point when a moving distance of the vehicle after detecting the first magnetic marker reaches a distance less by the reference distance than the span M.

Note that other configurations and operations and effects are similar to those of the first embodiment.

Reference Example

This reference example is an example of a configuration different from the configuration of the vehicular system 1, in which the tag reader repeatedly transmits electric waves without setting a communication period with a communication start point as a start time to search for the RF-ID tag. Technical issues that can occur when this configuration is adopted are described.

On urban roads and so forth, the number of vehicles that are present in a range where electric waves from each tag reader can reach is large, and the interference of electric waves become a problem. To reduce the interference of electric waves, for example, multi-channelization of electric waves and so forth can be thought. However, electric wave resources available for wireless communication are limited, and multi-channelization is also limited. Thus, in many countries, regions, organizations, and so forth, laws to restrict a period in which a tag reader can continue transmission of electric waves, and/or laws to restrict starting the transmission of electric waves while another tag reader is receiving electric waves, and so forth have been laid down.

Under these laws, it is inevitable to set a waiting period in which the tag reader does not transmit electric waves. If this waiting period is long, the tag reader may pass over the RF-ID tag during continuation of that period, and the frequency of missing the tag information is increased. If congestion occurs in an urban area with a large volume of traffic, the density of vehicles is further increased, and a possibility of missing the tag information is further increased. In this state, to ensure communication reliability, special communication circuit and/or processing circuit resistant to influences of the interference of electric waves, a highly-directional special antenna, and so forth are required. In this case, the possibility of increasing system costs on both of a vehicle side and an infrastructure side becomes high.

By contrast, in the vehicular system 1 of the first embodiment, a communication start point at which the tag reader 34 transmits electric waves is set, and the communication period with this communication start point as a start time terminates upon completion of reading the tag information. With this vehicular system 1, the communication period by the tag reader 34 can be reduced to a short time, and mutual interference between the tag readers can be effectively decreased.

While the specific examples of the present invention have been described above in detail as in the embodiments, these specific examples merely disclose examples of technologies included in the claims. Needless to say, the claims should not be restrictively construed by the configurations, numerical values, and so forth of the specific examples. The claims include technologies obtained by variously modifying, changing, and combining the specific examples as appropriate by using known technologies, knowledge by people skilled in the art, and so forth.

REFERENCE SIGNS LIST 1 vehicular system
10 magnetic marker
100 lane
15 RF-ID tag (wireless tag)
2 measuring unit (marker detecting part)
21 sensor array
32 control unit (communication start point setting part)
34 tag reader (wireless communication part)
5 vehicle

The invention claimed is:

1. A vehicular system, comprising:
a magnetic sensor configured to detect a magnetic marker laid in a road by sensing magnetism generated by the magnetic marker;
wireless communication circuitry configured to acquire tag information by executing a communication process with a wireless tag attached to the magnetic marker; and
processing circuitry configured to
in response to the magnetic sensor detecting the magnetic marker, set a communication start point at which the wireless communication circuitry is caused to start the communication process
with reference to a time point when the magnetic sensor detects the magnetic marker, wherein
the wireless communication circuitry is configured to
start the communication process at the communication start point set by the processing circuitry, and
terminate the communication process in response to acquiring the tag information from the wireless tag.

2. The vehicular system according to claim 1, wherein a period from the time point of detection to the communication start point depends on a vehicle speed of the vehicular system, which is a speed at which a vehicle including the vehicular system travels, and the period is shorter as the vehicle speed is higher and longer as the vehicle speed is lower.

3. The vehicular system according to claim 2, wherein
the processing circuitry is configured to set a forced termination point at which the communication process by the wireless communication circuitry is terminated, and
the wireless communication circuitry is configured to terminate the communication process at the forced termination point irrespective of whether the tag information is acquired or not.

4. The vehicular system according to claim 2, wherein
a plurality of magnetic markers each with the wireless tag attached thereto are arranged along a longitudinal direction of the road where a vehicle including the vehicular system, and
the processing circuitry sets, while the vehicle is traveling along the road, the communication start point based on a time point at which the vehicle reaches a position of a magnetic marker predicted to be detected next after the time point of detection.

5. The vehicular system according to claim 1, wherein
the processing circuitry is configured to set a forced termination point at which the communication process by the wireless communication circuitry is terminated, and
the wireless communication circuitry is configured to terminate the communication process at the forced termination point irrespective of whether the tag information is acquired or not.

6. The vehicular system according to claim 5, wherein the magnetic sensor and the wireless communication circuitry are arranged so as to be spaced with a span S in a longitudinal direction of a vehicle including the vehicular system vehicle with the magnetic sensor on a front side, and
the processing circuitry sets the communication start point based on a time point elapsed from the time point of detection by a time required for the vehicle to travel a distance of the span S.

7. The vehicular system according to claim 5, wherein the magnetic sensor and the wireless communication circuitry are arranged so as to be spaced with a span S in a longitudinal direction of a vehicle including the vehicular system with the magnetic sensor on the front side, and
the processing circuitry sets, as the communication start point, a time point elapsed from the time point of detection by a time required for the vehicle to travel a distance in which a reference distance is subtracted from a distance of the span S.

8. The vehicular system according to claim 5, wherein
a plurality of magnetic markers each with the wireless tag attached thereto are arranged along a longitudinal direction of the road where a vehicle including the vehicular system travels, and
the processing circuitry sets, while the vehicle is traveling along the road, the communication start point based on a time point at which the vehicle reaches a position of a magnetic marker predicted to be detected next after the time point of detection.

9. The vehicular system according to claim 5, wherein
a plurality of magnetic markers each attached with the wireless tag are arranged with spacing of span M along the longitudinal direction of the road, and
the processing circuitry sets, as the communication start point, a time point elapsed from the time point of detection by a time required for a vehicle including the vehicular system to travel a distance in which a reference distance is subtracted from a distance of the span M.

10. The vehicular system according to claim 1, wherein the communication process by the wireless communication circuitry includes a power-feeding process for supplying electric power required for operation to the wireless tag.

11. The vehicular system according to claim 10, wherein the magnetic sensor and the wireless communication circuitry are arranged so as to be spaced with a span S in a longitudinal direction of a vehicle including the vehicular system vehicle with the magnetic sensor on a front side, and the processing circuitry sets the communication start point based on a time point elapsed from the time point of detection by a time required for the vehicle to travel a distance of the span S.

12. The vehicular system according to claim 10, wherein the magnetic sensor and the wireless communication circuitry are arranged so as to be spaced with a span S in a longitudinal direction of a vehicle including the vehicular system with the magnetic sensor on the front side, and the processing circuitry sets, as the communication start point, a time point elapsed from the time point of detection by a time required for the vehicle to travel a distance in which a reference distance is subtracted from a distance of the span S.

13. The vehicular system according to claim 10, wherein a plurality of magnetic markers each with the wireless tag attached thereto are arranged along a longitudinal direction of the road where a vehicle including the vehicular system travels, and the processing circuitry sets, while the vehicle is traveling along the road, the communication start point based on a time point at which the vehicle reaches a position of a magnetic marker predicted to be detected next after the time point of detection.

14. The vehicular system according to claim 10, wherein a plurality of magnetic markers each attached with the wireless tag are arranged with spacing of span M along the longitudinal direction of the road, and the processing circuitry sets, as the communication start point, a time point elapsed from the time point of detection by a time required for a vehicle including the vehicular system to travel a distance in which a reference distance is subtracted from a distance of the span M.

15. The vehicular system according to claim 1, wherein the magnetic sensor and the wireless communication circuitry are arranged so as to be spaced with a span S in a longitudinal direction of a vehicle including the vehicular system with the magnetic sensor on a front side, and the processing circuitry sets the communication start point based on a time point elapsed from the time point of detection by a time required for the vehicle to travel a distance of the span S.

16. The vehicular system according to claim 1, wherein the magnetic sensor and the wireless communication circuitry are arranged so as to be spaced with a span S in a longitudinal direction of a vehicle including the vehicular system with the magnetic sensor on the front side, and the processing circuitry sets, as the communication start point, a time point elapsed from the time point of detection by a time required for the vehicle to travel a distance in which a reference distance is subtracted from a distance of the span S.

17. The vehicular system according to claim 1, wherein a plurality of magnetic markers each with the wireless tag attached thereto are arranged along a longitudinal direction of the road where the a vehicle including the vehicular system travels, and the processing circuitry sets, while the vehicle is traveling along the road, the communication start point based on a time point at which the vehicle reaches a position of a magnetic marker predicted to be detected next after the time point of detection.

18. The vehicular system according to claim 1, wherein a plurality of magnetic markers each attached with the wireless tag are arranged with spacing of span M along the longitudinal direction of the road, and the processing circuitry sets, as the communication start point, a time point elapsed from the time point of detection by a time required for a vehicle including the vehicular system to travel a distance in which a reference distance is subtracted from a distance of the span M.

19. The vehicular system according to claim 1, wherein the magnetic marker is a ferrite magnet.

20. The vehicular system according to claim 1, wherein the wireless tag is a Radio Frequency Identification (RF-ID) tag.

21. A tag communication method, comprising:

detecting, using a magnetic sensor, a magnetic marker laid in a road by sensing magnetism generated by the magnetic marker;

acquiring, using wireless communication circuitry, tag information by executing a communication process with a wireless tag attached to the magnetic marker; and in response to the magnetic sensor detecting the magnetic marker, setting, using processing circuitry, a communication start point at which the wireless communication circuitry is caused to start the communication process with reference to a time point when the magnetic sensor detects the magnetic marker, wherein the acquiring includes
starting the communication process at the communication start point set by the processing circuitry, and
terminating the communication process in response to acquiring the tag information from the wireless tag.

22. The tag communication method according to claim 21, wherein the communication process includes a power-feeding process for supplying electric power required for operation to the wireless tag.

* * * * *